US012565440B2

(12) United States Patent
Nozaki et al.

(10) Patent No.: US 12,565,440 B2
(45) Date of Patent: Mar. 3, 2026

(54) METHOD FOR PRODUCING CRYSTALLIZED GLASS MEMBER HAVING CURVED SHAPE

(71) Applicant: OHARA INC., Kanagawa (JP)

(72) Inventors: Moriji Nozaki, Kanagawa (JP); Toshitaka Yagi, Kanagawa (JP); Kohei Ogasawara, Kanagawa (JP)

(73) Assignee: OHARA INC., Kanagawa (JP)

( * ) Notice: Subject to any disclaimer, the term of this patent is extended or adjusted under 35 U.S.C. 154(b) by 107 days.

(21) Appl. No.: 18/373,886

(22) Filed: Sep. 27, 2023

(65) Prior Publication Data

US 2024/0018029 A1 Jan. 18, 2024

Related U.S. Application Data

(62) Division of application No. 17/043,759, filed as application No. PCT/JP2019/010172 on Mar. 13, 2019.

(30) Foreign Application Priority Data

Apr. 20, 2018 (JP) ................................. 2018-081295

(51) Int. Cl.
C03B 23/02 (2006.01)
C03B 32/02 (2006.01)
C03C 3/085 (2006.01)

(52) U.S. Cl.
CPC .............. *C03B 23/02* (2013.01); *C03B 32/02* (2013.01); *C03C 3/085* (2013.01);
(Continued)

(58) Field of Classification Search
None
See application file for complete search history.

(56) References Cited

U.S. PATENT DOCUMENTS

2009/0277224 A1 11/2009 Angel et al.
2015/0376054 A1* 12/2015 Beall ....................... C03C 3/097
65/30.14
(Continued)

FOREIGN PATENT DOCUMENTS

JP S56104747 A 8/1981
JP 2016121050 A 7/2016
(Continued)

OTHER PUBLICATIONS

JP 2016-37424 machine translation, Minowa et al., Heat-Treatment Method and Molding Method of Glass Plate, Mar. 2016 (Year: 2016).*
(Continued)

*Primary Examiner* — Queenie S Dehghan
(74) *Attorney, Agent, or Firm* — Li & Cai Intellectual Property (USA) Office

(57) ABSTRACT

To obtain a crystallized glass member having a curved shape and provide a method for producing the same. A method for producing a crystallized glass member having a curved shape, including a deformation step for adjusting the temperature of a plate glass to a first temperature zone from higher than [At+40]° C. to [At+146]° C. or lower, where At is the yield point (° C.) of the plate glass and deforming at least part of the plate glass into a curved shape by external force acting on the plate glass while precipitating crystals from the plate glass.

5 Claims, 5 Drawing Sheets

(52) U.S. Cl.
CPC ...... *C03B 2201/07* (2013.01); *C03B 2201/32* (2013.01); *C03B 2201/42* (2013.01)

(56) References Cited

U.S. PATENT DOCUMENTS

| | | |
|---|---|---|
| 2016/0355434 A1 | 12/2016 | Momono |
| 2018/0141853 A1 | 5/2018 | Momono |
| 2019/0169061 A1* | 6/2019 | Jones ..................... H05K 5/03 |

FOREIGN PATENT DOCUMENTS

| | | |
|---|---|---|
| JP | 20171937 A | 1/2017 |
| JP | 2017190265 A | 10/2017 |
| WO | WO 2017/179401 A1 | 10/2017 |

OTHER PUBLICATIONS

WO 2015019989 machine translation, Fushie Takashi, Photosensitive Glass Molded Article, Feb. 2015. (Year: 2015).*

USPTO, Office action issued on May 21, 2024 regarding U.S. Appl. No. 17/043,759.

Japan Patent Office, Office Action issued on Jul. 30, 2024 for JP application No. 2023-119960.

WO, International Search Report issued on May 21, 2019 regarding international application No. PCT/JP2019/010172.

Shoji Dobashi, "Chemistry of Glass", Kodansha Modern Chemistry Series 10, Kodansha, Tokyo Japan, Apr. 24, 1972 (Apr. 24, 1972).

* cited by examiner (a)

(b)

(a)

(b)

METHOD FOR PRODUCING CRYSTALLIZED GLASS MEMBER HAVING CURVED SHAPE

CROSS-REFERENCE TO RELATED PATENT APPLICATION

This application is a divisional application of the U.S. patent application Ser. No. 17/043,759, filed on Sep. 30, 2020, and entitled "METHOD FOR PRODUCING CRYSTALLIZED GLASS MEMBER HAVING CURVED SHAPE", the entire disclosures of which are incorporated herein by reference.

FIELD OF THE DISCLOSURE

The present disclosure relates to a method for producing a crystallized glass member having a curved shape.

BACKGROUND OF THE DISCLOSURE

In recent years, to increase the degree of freedom in smartphone design, manufacturers have started to use glass members with a curved shape for the cover glass and the housing. When producing such glass members, it is advantageous, from the viewpoint of costs of manufacturing, to obtain the curved shape through the heat-processing of a glass plate. Furthermore, these glass members are required to be difficult to break, even upon impact by external factors. Therefore, it is desirable that the glass used as the glass member for the cover glass or the housing of a smartphone exhibits high mechanical strength and excellent heat workability, and accordingly, chemically strengthened glass is often selected. Moreover, from an aesthetic viewpoint, glass of various colors is desired.

Patent Document 1 describes a method for producing chemically strengthened glass in which curved surface processing is performed simultaneously with crystallization.

PRIOR ART DOCUMENT

Patent Document

[Patent Document 1] Japanese Unexamined laid-open application No. 2017-190265

SUMMARY OF THE DISCLOSURE

Problems to be Solved by the Disclosure

The object of the present disclosure is to provide a crystallized glass member having a curved shape and a method for producing the same. More specifically, the object is to provide a crystallized glass member having a curved shape, which is suitable for use as the housing for a smartphone. A further object is to provide a colored crystallized glass member having a curved shape.

As a result of thorough investigations, the present inventors have found that a rectangular plate can be deformed into a shape in which four sides are curved inward by heat treatment at a temperature higher than in the conventional process, thereby completing the present disclosure. The specific configurations are described as follows.

(Configuration 1)

A method for producing a crystallized glass member having a curved shape, including a deformation step for adjusting the temperature of a plate glass to a first temperature zone from higher than $[At+40]^\circ$ C. to $[At+146]^\circ$ C. or lower, where At is the yield point ($^\circ$ C.) of the plate glass and deforming at least part of the plate glass into a curved shape by external force acting on the plate glass while precipitating crystals from the plate glass.

(Configuration 2)

The method for producing a crystallized glass member having a curved shape according to item 1, wherein the first temperature range is from $[At+50]^\circ$ C. or higher to $[At+145]^\circ$ C. or lower.

(Configuration 3)

The method for producing a crystallized glass member having a curved shape according to item 1 or 2, wherein
the plate glass includes, in terms of oxide-based weight %,
40.0% to 70.0% $SiO_2$ component,
11.0% to 25.0% $Al_2O_3$ component,
5.0% to 19.0% $Na_2O$ component,
0% to 9.0% $K_2O$ component,
1.0% to 18.0% of at least one selected from MgO component and ZnO component,
0% to 3.0% CaO component,
0.5% to 12.0% $TiO_2$ component,
0 to 15.0% $Fe_2O_3$ component, and
0 to 2.00% $CoO+Co_3O_4$ component.

(Configuration 4)

The method for producing a crystallized glass member having a curved shape according to any one of items 1 to 3, further including a heat treatment step of heating the plate glass or the deformed plate glass to a second temperature range to precipitate crystals before or after the deformation step.

(Configuration 5)

The method for producing a crystallized glass member having a curved shape according to any one of items 1 to 4, further including an ion exchange treatment step to create a compressive stress layer on the surface by performing an ion exchange treatment on the crystallized glass member having the curved shape after the deformation step.

(Configuration 6)

A crystallized glass member having a curved shape in which four sides of a rectangular plate are curved inward, wherein the crystallized glass member includes, in terms of oxide-based weight %,
40.0% to 70.0% $SiO_2$ component,
11.0% to 25.0% $Al_2O_3$ component,
5.0% to 19.0% $Na_2O$ component,
0% to 9.0% $K_2O$ component,
1.0% to 18.0% of at least one selected from MgO component and ZnO component,
0% to 3.0% CaO component,
0.5% to 12.0% $TiO_2$ component,
0 to 15.0% $Fe_2O_3$ component, and
0 to 2.00% $CoO+Co_3O_4$ component.

(Configuration 7)

The crystallized glass member according to item 6, wherein the curved surface of the inward curved portion has a curvature radius R of 1 to 12 mm.

(Configuration 8)

The crystallized glass member according to item 6 or 7, which is transparent or opaque,
colorless or colored black, blue or white or a mixed color thereof.

(Configuration 9)

The crystallized glass member according to any one of items 6 to 8, which has a compressive stress layer on the surface thereof.

Effect of the Disclosure

According to the present disclosure, a crystallized glass member having a curved shape can be obtained and a method for producing the same is provided.

The crystallized glass member having a curved shape of the present disclosure can be suitably used as a cover glass for a smartphone, a housing for a smartphone, a cover glass for a watch, a HUD (head-up display) substrate used for on-vehicle applications, a cover glass for a near-infrared sensor, an interior part of a transportation machine such as an automobile and an airplane, and parts used in other electronic equipment and machinery.

DETAILED DESCRIPTION OF THE EXEMPLARY EMBODIMENTS

Figure 1:
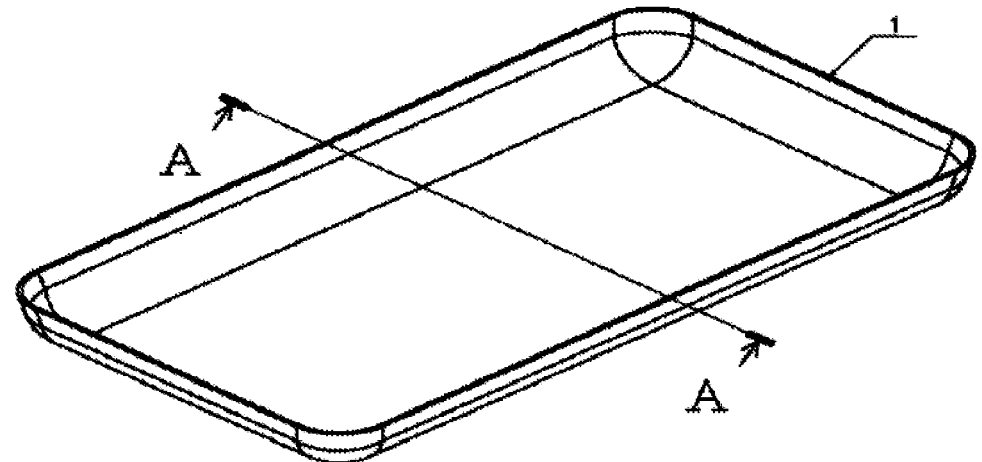
FIG. 1 A perspective view showing an example of a curved shape of the crystallized glass member of the present disclosure.

The method for producing a crystallized glass member having a curved shape according to the present disclosure is characterized by including a deformation step for adjusting the temperature of a plate glass to a first temperature zone from higher than $[At+40]°$ C. to $[At+146]°$ C. or lower, where At is the yield point (° C.) of the plate glass and deforming at least part of the plate glass into a curved shape by external force acting on the plate glass while precipitating crystals from the plate glass. Henceforth, the manufacturing method of the present disclosure will be described in detail.

[Process of Preparing Plate Glass]

A plate glass is prepared. The plate glass may be amorphous or crystallized.

There is no particular restriction on the composition of the plate glass; however, preferably, it includes, in terms of oxide-based weight %, 40.0% to 70.0% $SiO_2$ component,
11.0% to 25.0% $Al_2O_3$ component,
5.0% to 19.0% $Na_2O$ component,
0% to 9.0% $K_2O$ component,
1.0% to 18.0% of at least one selected from MgO component and ZnO component,
0% to 3.0% CaO component,
0.5% to 12.0% $TiO_2$ component,
0 to 15.0% $Fe_2O_3$ component, and
0 to 2.00% $CoO+Co_3O_4$ component.

Unless specified otherwise, the content of each component in the present specification is expressed as oxide-based weight %. Here, the term "oxide-based" means, assuming that all the glass constituent components are decomposed and converted into oxides, the amount of each of the oxides contained in the glass expressed in % by weight when the total weight of the oxides is 100% by weight.

When producing a transparent or white member, the exclusion of the $Fe_2O_3$ component and $CoO+Co_3O_4$ component is preferable.

When producing a black member, it is preferable to include the $Fe_2O_3$ component and $CoO+Co_3O_4$ component.

When producing a member colored from blue to black (for example, deep blue, blackish blue), it is preferable to include the $CoO+Co_3O_4$ component but no $Fe_2O_3$ component.

The $SiO_2$ component is more preferably contained in an amount of 45.0% to 65.0%, and still more preferably 50.0% to 60.0%.

The content of the $Al_2O_3$ component is more preferably from 13.0% to 23.0%.

The $Na_2O$ component is more preferably contained in an amount of 8.0% to 16.0%. The content may be 9.0% or more or 10.5% or more. Large $Na_2O$ content enhances chemical strengthening.

The $K_2O$ component is more preferably contained in an amount of 0.1% to 7.0%, still more preferably 1.0% to 5.0%.

The at least one selected from the MgO component and ZnO component is more preferably contained in an amount of 2.0% to 15.0%, still more preferably 3.0% to 13.0%, particularly preferably 5.0% to 11.0%. The at least one selected from the MgO component and ZnO component may be the MgO component alone, ZnO component alone, or both, but preferably only the MgO component.

The CaO component is more preferably contained at 0.01% to 3.0%, still more preferably 0.1% to 2.0%.

The $TiO_2$ component is more preferably contained in an amount of 2.0% to still more preferably 3.0% to 10.0%, and particularly preferably 3.5% to 8.0%. To facilitate crystallization, the amount of the $TiO_2$ component is preferably 1.5 mol % or more, more preferably 2.0 mol % or more, still more preferably 3.0 mol % or more.

When producing a black member, the amount of the $Fe_2O_3$ component is more preferably 1.5% to 12.0%, still more preferably 2.0% to 10.0%.

The combined amount of CoO component and $Co_3O_4$ component ($CoO+Co_3O_4$ component), is more preferably 0.05% to 0.80%, still more preferably 0.08% to 0.50%.

When producing a member colored from blue to black, the $CoO+Co_3O_4$ component is more preferably contained in an amount of 0.05% to 3.5%, still more preferably 0.10% to 2.50%.

The glass may contain 0.01% to 3.0% (preferably 0.02% to 2.0%, more preferably 0.05% to 1.0%) of at least one selected from $Sb_2O_3$ component, $SnO_2$ component, and $CeO_2$ component.

The above blending amounts can be combined as required.

The total amount of $SiO_2$ component, $Al_2O_3$ component, $Na_2O$ component, at least one selected from MgO component and ZnO component, $TiO_2$ component, $Fe_2O_3$ component, and $CoO+Co_3O_4$ component is 90% or more, preferably 95% or more, more preferably 98% or more, and still more preferably 98.5% or more.

The total amount of $SiO_2$ component, $Al_2O_3$ component, $Na_2O$ component, $K_2O$ component, at least one selected from MgO component and ZnO component, CaO component, $TiO_2$ component, $Fe_2O_3$ component, $CoO+Co_3O_4$ component, and at least one selected from $Sb_2O_3$ component, $SnO_2$ component and $CeO_2$ component can be 90% or more, preferably 95% or more, more preferably 98% or more, still more preferably 99% or more. These components may make up 100%.

Optionally, the glass may contain a $ZrO_2$ component as long as the effect of the present disclosure is not impaired. The blending amount can be 0 to 5.0%, 0 to 3.0% or 0 to 2.0%.

Further, as long as the effect of the present disclosure is not impaired, the glass may optionally contain a $B_2O_3$ component, $P_2O_5$ component, BaO component, $SnO_2$ component, $Li_2O$ component, SrO component, $La_2O_3$ component, $Y_2O_3$ component, $Nb_2O_5$ component, $Ta_2O_5$ component, WO3 component, $TeO_2$ component, and $Bi_2O_3$ component. The respective blending amounts can be 0 to 2.0%, from 0 or more to less than 2.0%, or 0 to 1.0%.

As a fining agent, the glass may optionally contain, in addition to the $Sb_2O_3$ component, $SnO_2$ component and $CeO_2$ component, an $As_2O_3$ component and one or more selected from the group of F, NOx and SOx. However, the upper limit of the content of the fining agent is preferably 5.0%, more preferably 2.0%, and most preferably 1.0%. Note that because SOx (x is 3, etc.) is unstable under redox conditions and may adversely affect the color of glass, its inclusion is undesirable.

The glass may optionally contain other components not mentioned above, as long as the characteristics of the crystallized glass member of the present disclosure are not impaired. For example, metal components (including their oxides) such as Nb, Gd, Yb, Lu, V, Cr, Mn, Ni, Cu, Ag and Mo can be mentioned. However, when producing a blue member or the like, if metal components (and their oxides) such as V, Cr, Mn, Ni, Cu, Ag, Au and Mo are included individually or in combination even in small amounts, since the color of the glass may be impaired, it is preferable to substantially avoid their presence.

Moreover, because in recent years the use of Pb, Th, Tl, Os, Be, Cl, and Se components has been limited as harmful chemical substances, it is preferable to substantially avoid their presence.

The plate glass is produced, for example, as follows. The raw materials are homogeneously mixed so that the amount of each of the above-mentioned components is within the predetermined range, the mixed raw materials are put into a platinum or quartz crucible, melted in an electric furnace or gas furnace within a temperature range from 1300 to 1550° C. for 5 to 24 hours to obtain molten glass, and homogenized by stirring. Melting can also be performed in a tank furnace made of refractory bricks to obtain molten glass. Subsequently, the molten glass is cooled to an appropriate temperature, cast into a mold to form a block or columnar shape and then annealed.

The block or columnar shaped glass may be further heat treated for crystallization. This heat treatment may be performed in one or in two steps.

In the two-step heat treatment, first, a nucleation step is performed by heat treatment at a first temperature. Then, after this nucleation step, a crystal growth process is performed by heat treatment at a second temperature higher than that of the nucleation step.

In the one-step heat treatment, the nucleation step and the crystal growth step are carried out continuously at a one-step temperature. Usually, the temperature is raised to a predetermined heat treatment temperature, and after reaching the heat treatment temperature, it is maintained for a certain period of time, and then the temperature is lowered.

The first temperature of the two-step heat treatment is preferably 600° C. to 750° C. The holding time at the first temperature is preferably 30 minutes to 2000 minutes, more preferably 180 minutes to 1440 minutes.

The second temperature of the two-step heat treatment is preferably 650° C. to 850° C. The holding time at the second temperature is preferably 30 minutes to 600 minutes, more preferably 60 minutes to 300 minutes.

If the heat treatment is carried out at the one-step temperature, the preferable heat treatment temperature is 600° C. to 800° C., more preferably 630° C. to 770° C. Furthermore, the holding time at the temperature of the heat treatment is preferably 30 minutes to 500 minutes, more preferably 60 minutes to 300 minutes.

By crystallization in the stage of the plate glass, the crystallization time for obtaining the desired crystal in the subsequent heat treatment step or deformation step can be reduced.

The block-shaped or columnar glass is formed into a plate by cutting and grinding. Alternatively, the molten glass after stirring and homogenizing may be directly formed into a plate shape by a method such as a float method or a slit down draw method, and then annealed to produce a plate glass.

[Heat Treatment Process]

Before or after the deformation step, crystals may be precipitated from the plate glass or molded glass in the heat treatment step. Usually, the crystallization temperature (second temperature range) is preferably from [Tg]° C. or higher to [At+146]° C. or lower, where the glass transition point of glass is denoted as Tg (° C.) and the yield point as At (° C.). The holding time after attaining the crystallization temperature is preferably 0 to 500 minutes, more preferably 0 to 400 minutes, and still more preferably 0 to 300 minutes. The suitable second temperature range is similar to the first one, but the second temperature range and the holding time are adjusted according to the desired amount of crystals in the glass member. By providing the heat treatment step, the crystallization time in the deformation step can be reduced or the crystallization temperature can be decreased.

If a white member is produced, the crystallization temperature may be increased and/or the crystallization time may be prolonged to enhance crystallization and whitening. If a transparent or other colored member is manufactured, since the color generally becomes cloudy with the advance of crystallization, adjustment is made to avoid extreme crystallization.

[Deformation Process]

In the deformation process, the temperature of the plate glass is set to a temperature range (first temperature range) that is higher than [At+40]° C. and lower than or equal to [At+146]° C. when denoting the yield point (° C.) of the plate glass as At. By applying an external force on the plate glass while crystals are precipitated therefrom, at least a part of the plate glass is deformed into a curved shape.

The upper limit of the temperature range can be [At+130]° C. or less, [At+120]° C. or less, [At+110]° C. or less, [At+100]° C. or less, [At+90]° C. or less, or [At+80]° C. or less. The lower limit can be [At+50]° C. or higher, [At+60]° C. or higher, [At+70]° C. or higher, [At+90]° C. or higher, or [At+100]° C. or higher.

If the temperature is low, the desired curved shape cannot be obtained and cracks are formed during molding. If the temperature is high, the plate thickness of the member is not uniform, and the member may be fused to the molding die or the shape may be deformed.

By molding in the above temperature range, for example, it is possible to mold a shape in which four sides of a rectangle are curved inward. The plate thickness can be made substantially uniform.

In the case of producing a transparent glass, adjustments are made to avoid turbid color with crystallization. The upper limit of the temperature range can be [At+80]° C. or lower, [At+75]° C. or lower or [At+70]° C. or lower.

There is no particular restriction on the heating rate to the deformation temperature, but the higher the heating rate, the better. If heating is too slow, the work efficiency will be poor.

Furthermore, by performing annealing after deformation, the strain of the plate glass after deformation can be eliminated. The rate of temperature decrease is preferably from 3° C./sec or more to 20° C./sec or less, more preferably from 5° C./sec or more to 15° C./sec or less. It is preferable to stay within this range because the strain inside the plate glass can be sufficiently removed, and the time involved in the process will not be longer than necessary. After the annealing is completed, the glass plate is taken out from the furnace and allowed to be naturally cooled to room temperature.

By supporting at least a part of the plate glass and applying an external force thereon, the plate glass can be deformed to have a curved shape. A curved shape (for example, a smartphone housing shape as shown in FIG. 1) in which four sides of a rectangular plate are curved inward can be formed. The rectangle may be roughly rectangular or a square. The four peripheral sides are preferably bent inward by 70 to 110 degrees (preferably 70 to 90 degrees) with respect to the tangent to the bottom surface of the plate glass. The tangent to the bottom surface is the tangent line drawn when the plate glass is installed on a flat surface as symmetrically as possible.

Figure 2:
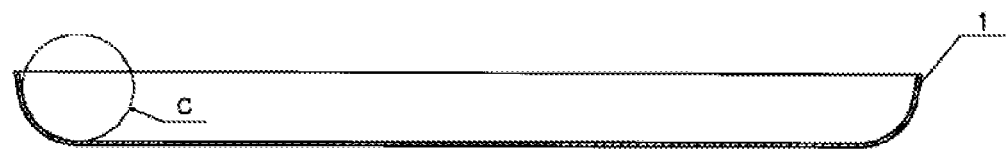
FIG. 2 A sectional view taken along the line A-A of the curved shape shown in FIG. 1.

Furthermore, when an approximate circle C is assumed along the curved surface of the curved portion shown in FIG. 2, the radius of this circle (curved surface radius of curved surface) (R) (mm) is, for example, in the range from 1 to 12, preferably from 3 to 10, and more preferably from 4 to 8 according to the measurement method described in the examples.

When forming a curved shape with a molding die, the molding die also has a curved shape in which four sides of a rectangular plate are curved inward. The plate glass is deformed along the shape of this mold. The absolute value of AR expressing the difference between R of the mold and R of the crystallized glass member after molding is in the range of, for example, 0 to 7, preferably 0 to 5 and more preferably 0 to 3.

Figure 3:
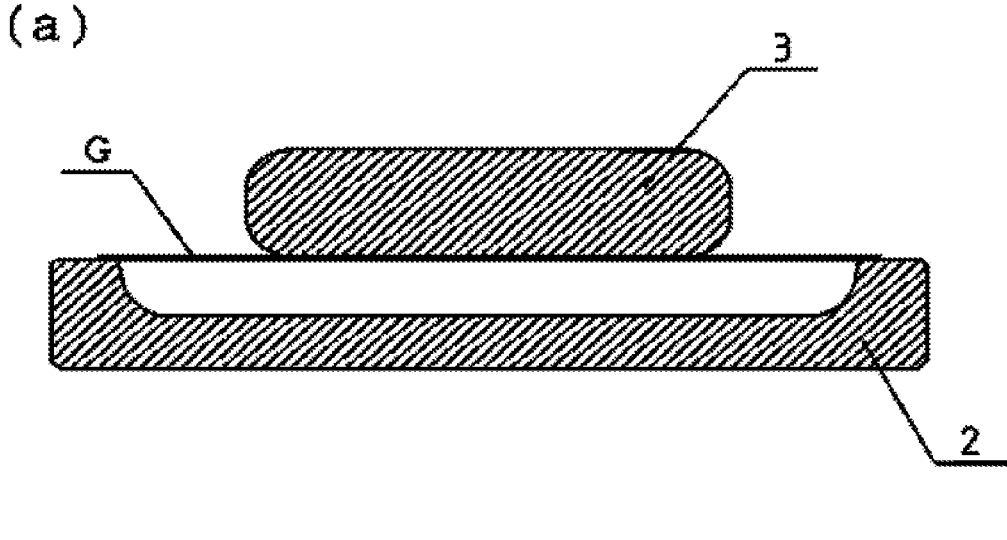
FIG. 3 An illustration showing an example of the mode of deformation process of the present disclosure, as seen from a direction in which a cross section of the plate glass appears. (a) is a figure before deformation, (b) is a figure after deformation.
Figure 3:
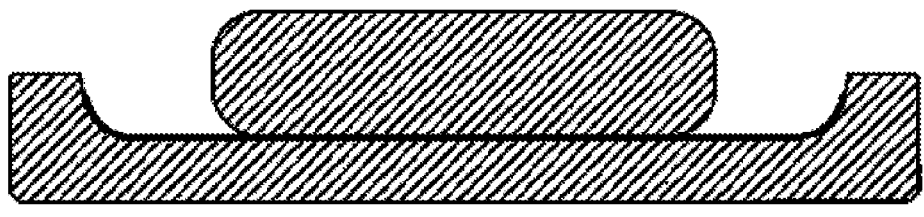
Figure 4:
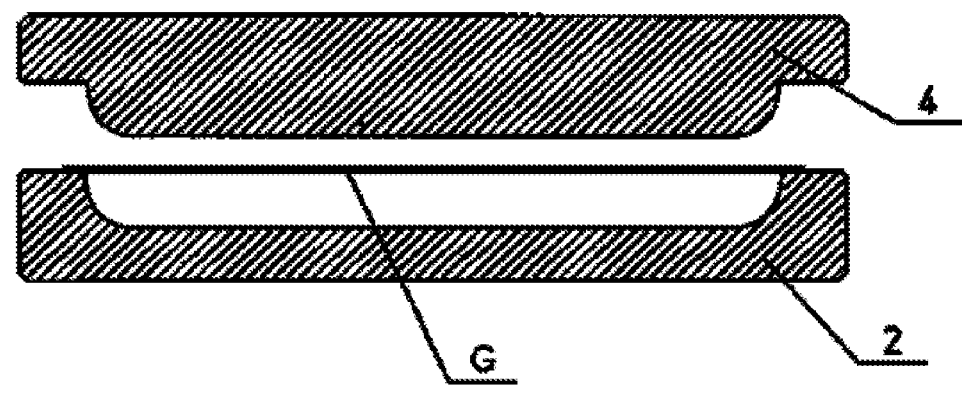
FIG. 4 An illustration showing an example of the mode of deformation process of the present disclosure, as seen from a direction in which a cross section of the plate glass appears. (a) is a figure before deformation, (b) is a figure after a deformation.
Figure 4:
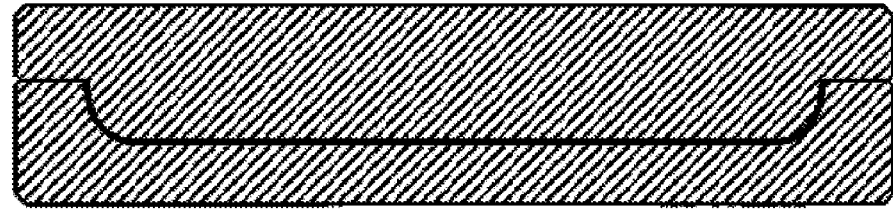

FIGS. 3 and 4 show a mode in which the plate glass is deformed by applying force thereon.

FIG. 3 shows a mode in which the plate glass G is put on the molding die 2 and the force exerted on the plate glass G by the load (upper mold) 3 placed on the upper surface of the plate glass G contributes to the deformation thereof. The load (upper mold) 3 exerts a force on the plate glass G by the action of gravity.

FIG. 4 shows a mode in which the plate glass G is put on the molding die 2 and the force exerted by the pressing member 4 contributes to the deformation thereof. A force generated from a power source (not illustrated) is transmitted to the pressing member 4 and applies force on the plate glass G.

In the deformation process, the external force exerted on the plate glass is preferably 0.2 to 1.2 kg/cm², more preferably 0.3 to 1.0 kg/cm² and still more preferably 0.4 to 0.9 kg/cm². Depending on the time of action as well, if external force is too small, it may not be possible to obtain the desired shape; if it is too large, the material may get fused to the molding die or the variation in plate thickness may increase along with the risk of cracking.

The external force acting on the plate glass may be gravity, a force exerted on the plate glass by the load placed on the upper surface of the glass plate, a force exerted on the plate glass by a pressing member, or a resultant force thereof. In other words, at least a part of the external force may be gravity, may be a force exerted on the plate glass by the load placed on the upper surface thereof, or a force exerted on the plate glass by the pressing member.

The time of action of the external force is preferably 1 to 50 seconds, more preferably 2 to 40 seconds and still more preferably 3 to 35 seconds. Depending on the extent of the external force, if the time is too short, the desired shape may not be obtained, and if the time is too long, the material may get fused to the molding die and the variation in plate thickness may increase along with the risk of cracking.

To design the temperature and time conditions of the heat treatment and deformation processes, the specific gravity corresponding to the desired crystal precipitation amount of the crystallized glass member is measured in advance to set a target specific gravity, and the temperature and time conditions of the heat treatment and deformation processes are defined in such a manner that the specific gravity of the plate glass after completing the process according to the method for producing of the present disclosure correspond to the target specific gravity.

As a crystal phase, the obtained crystallized glass member contains, for example, $MgAl_2O_4$, $Mg_2TiO_5$, $MgTi_2O_5$, $Mg_2TiO_4$, $MgTi_2O_4$, $Mg_2SiO_4$, $MgSiO_3$, $MgAl_2Si_2O_8$, $Mg_2Al_4Si_5O_{18}$, $NaAlSiO_4$ and $FeAl_2O_4$ and one or more solid solutions thereof.

[Chemical Strengthening Process]

A compressive stress layer may be formed on the crystallized glass member to further increase the mechanical strength. The crystallized glass member having a curved shape obtained by the production method of the present disclosure has high mechanical properties in advance due to precipitated crystals, and still higher strength can be achieved by forming a compressive stress layer.

Regarding the method for forming the compressive stress layer, for example, there is the chemical strengthening method for forming a compressive stress layer in the surface layer by exchanging an alkaline component present in the surface layer of the crystallized glass member with an alkaline component having a larger ionic radius. Furthermore, there is the thermal strengthening method in which a crystallized glass member is heated and then rapidly cooled, and an ion implantation method in which ions are injected into the surface layer of the crystallized glass member.

The chemical strengthening method can be carried out with the following process. The crystallized glass member is brought into contact with or immersed in a molten salt obtained by heating a salt containing potassium or sodium— e.g., potassium nitrate ($KNO_3$), sodium nitrate ($NaNO_3$), or a complex salt thereof—at 350 to 600° C. for 0.1 to 12 hours. In this way, an ion exchange reaction occurs between the component existing in the glass phase near the surface and the component contained in the molten salt. As a result, a compressive stress layer is formed on the surface portion of the crystallized glass member.

The stress depth of the compressive stress layer of the crystallized glass member is preferably 40 μm or more; for example, it can be 55 μm or more, and 60 μm or more. The upper limit can be, for example, 300 μm or less, 200 μm or less, or 100 μm or less. With a compressive stress layer of that thickness, even if a deep crack is formed in the crystallized glass member, it is possible to prevent the crack from extending and the substrate from breaking.

The surface compressive stress of the compressive stress layer is preferably 750 MPa or more, more preferably 900 MPa or more, and still more preferably 950 MPa or more. The upper limit can be, for example, 1300 MPa or less, 1200 MPa or less, or 1100 MPa or less. With this extent of compressive stress value, propagation of cracks can be suppressed and the mechanical strength can be increased.

[Crystallized Glass Member]

The crystallized glass member of the present disclosure has a curved surface shape in which four sides of a rectangular plate are curved inward. The shape is the same as above, and the description is omitted.

The crystallized glass member includes, expressed in terms of oxide-based weight %, 40.0% to 70.0% $SiO_2$ component,
11.0% to 25.0% $Al_2O_3$ component,
5.0% to 19.0% $Na_2O$ component,
0% to 9.0% $K_2O$ component,
1.0% to 18.0% of at least one selected from MgO component and ZnO component,
0% to 3.0% CaO component,
0.5% to 12.0% $TiO_2$ component,
0 to 15.0% $Fe_2O_3$ component, and
0 to 2.00% $CoO+Co_3O_4$ component.

Regarding the composition of the crystallized glass member, the description about the composition of the plate glass can be applied.

The crystallized glass member can be transparent or whitened (opaque), and can be colorless, or colored black, blue, white, or a mixed color thereof. In the manufacturing process, the higher the temperature and/or the longer the heating time, the more the crystallization and whitening tend to occur. The crystal precipitation amount can be adjusted according to the application.

The crystallized glass member having a curved shape of the present disclosure can be produced by the above method, and can also have a compressive stress layer on the surface.

EXAMPLES

Examples 1 to 45

[Production of Crystallized Glass Member]

First, plate glass was produced that served as raw glass for the crystallized glass member. As raw materials for each component, various corresponding raw materials such as oxides, hydroxides, carbonates, nitrates, fluorides, chlorides, hydroxides and metaphosphoric acid compounds were selected, and the raw materials shown in Table 1 were weighed so as to have the composition ratios of the examples and uniformly mixed. Next, the mixed raw materials were placed in a platinum crucible and melted in an electric furnace at a temperature range of 1300 to 1550° C. for 5 to 24 hours, depending on the degree of difficulty to melt the glass composition. Subsequently, the molten glass was stirred and homogenized, then cast into a mold or the like and annealed to prepare an original glass ingot. This ingot was crystallized by heat treatment at 705° C. for 5 hours. Examples 1 to 17 related to colorless transparent glasses, Examples 18 to 31 to opaque black glasses and Examples 32 to 45 to transparent blue glasses.

The obtained ingot was cut and ground into a rectangular plate glass. Thereafter, this plate glass was polished.

Tables 2 to 4 show the glass transition point Tg (° C.), yield point At (° C.) and specific gravity of the plate glass.

The glass transition point (Tg) and the yield point (At) of the plate glass were measured as follows. A round bar-shaped sample of 50 mm in length and 4±0.5 mm in diameter with the same composition as the plate glass was prepared. The temperature and elongation of this sample were measured using a TD5000SA thermal dilatometer high-temperature measuring instrument of Bruker AEX Co., Ltd. according to the Japan Optical Glass Industry Association standard JOGIS08-2003 "Measuring method of thermal expansion of optical glass." A measuring load of 10 gf was applied to the sample in the longitudinal direction. The glass transition point (Tg) was determined from the thermal expansion curve obtained by measuring the temperature and the elongation of the sample based on JOGIS08-2003. The yield point was the temperature at which the sample softened and contracted after expansion due to the measuring load.

Next, in examples 2 to 8, 13, 15, 17, 19 to 25, 27, 29, 31, 33 to 39, 41, 43 and 45, heat treatment was performed under the heat treatment conditions shown in Tables 2 to 4 for crystallization. Lack of data in the "heat treatment conditions" column in the table means the absence of heat treatment. When the holding time was 0 hour at 800° C., the transparency tended to be maintained.

Furthermore, under the deformation conditions shown in Tables 2 to 4, the plate glass was formed in the mold (lower mold) by a pressing member, and the four sides of the rectangle were folded inward, as shown in FIG. 1, whereby the plate glass was bent into a lunch-box shaped curved surface that is bent about 70 to about 90 degrees with respect to the tangent to the bottom surface of the plate glass.

In this deformation process, crystallization of the glass progressed along with the deformation. The temperature of the furnace was adjusted so that the temperature of the plate glass corresponds to the deformation temperature. At a temperature of 830° C. or higher, opacification was likely to progress.

Furthermore, in the example, since the temperature of the plate glass cannot be directly measured, the temperature of the lower mold was measured by making a hole of 1.7 mm in the central portion from the side surface of the lower mold, inserting a 1.6 mm thermocouple into the hole, and taking the value as the temperature of the plate glass.

In each of examples 1 to 45, the plate glass was deformed along the mold, and a crystallized glass member having the required curved shape could be obtained. In the thus produced crystallized glass member, crystals were precipitated in a desired amount and the desired transparency or color was obtained.

Specifically, in examples 1 to 17, molded glass ranging from colorless transparent to whitened white was obtained. In examples 18 to 31, molded glass was obtained ranging from transparent blue to whitened opaque light blue. In examples 32 to 45, molded glass was obtained ranging from opaque black to whitened opaque gray.

In addition, the specific gravity of the obtained crystallized glass member was measured. The results are shown in Tables 2 to 4.

[Evaluation of Crystallized Glass Member]

(1) Curvature Radius R of Curved Portion

Figure 5:
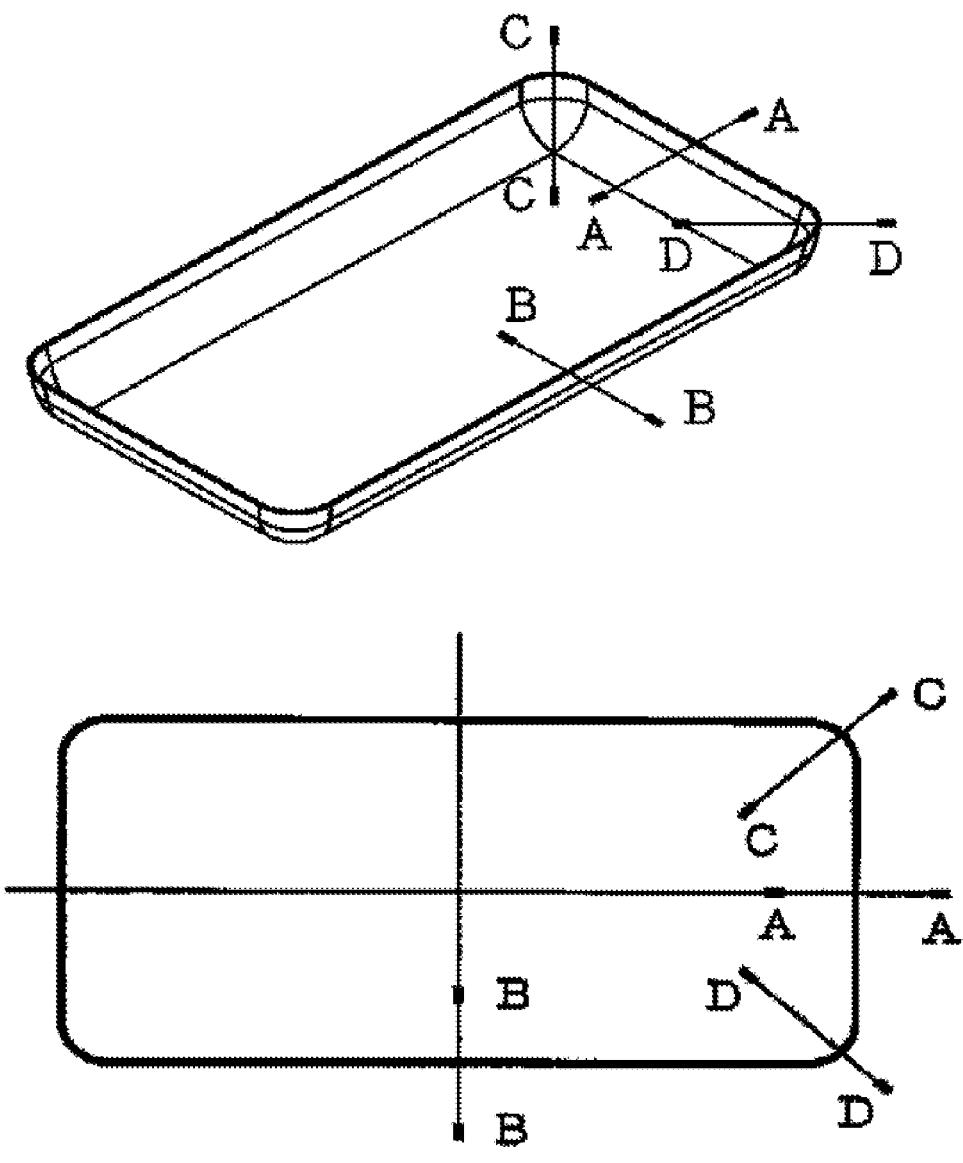
FIG. 5 An illustration showing the position where the radius of curvature of the crystallized glass member is measured in the example.

The radius R (mm) of the circle approximated from the curve of the inner curved portion of the crystallized glass member obtained in Example 1 was measured at the positions A, B, C, and D shown in FIG. 5. The SV-C4100, manufactured by Mitsutoyo Corporation, was used as a measuring device, and a circle was approximated from a curve obtained by measuring a side surface portion with a stylus having a radius of 0.02 mm to obtain a radius R (mm) of the circle. The R of the glass member was 5.7 to 7.8 mm, the R of the mold was 4.8 to 5.3, and the difference AR between R of the mold and R of the glass member was 0.4 to 2.8.

The radius R (mm) of the circle for the crystallized glass member obtained in Example 11 was measured in the same manner. The R of the glass member was 4.8 to 6.0 mm. The R of the mold was 4.8 to 5.3, and the difference AR between R of the mold and R of the glass member was 0.1 to 1.1.

(2) Chromaticity

For the crystallized glass member, a reflection spectrum including specular reflection at an incident angle of 5 degrees with respect to the reflection surface was measured using a spectrophotometer (V-650, a product of Nippon Bunko Corporation). At this time, the sample thickness was 0.7 mm, and the measurement was carried out without placing a white alumina plate on the back surface of the glass (the side opposite to the glass surface illuminated by the light source). From this spectrum, L*, a* and b* were obtained at an observer angle of 2 degrees with CIE light source D65. The results are shown in Tables 2 to 4.

L*, a*, and b* were measured in the same way also for the plate glass before the deformation process and the results are shown in Table 5. In addition, for a part of the examples (Examples 1 to 8, 18 to 26, 28, 30, 32 to 39), Table 6 shows the difference in L*, a*, and b* before and after the deformation process. In Table 6, a large increase in L* is a sign of whitening.

(3) Plate Thickness

Figure 6:
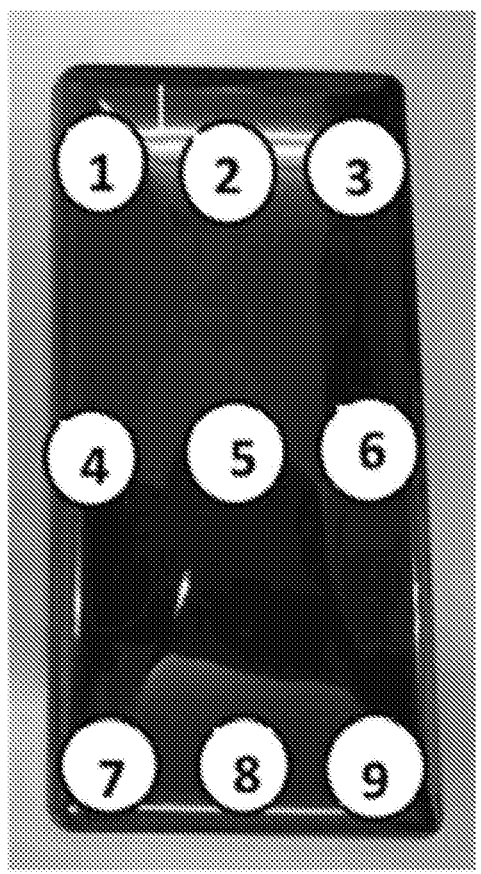
FIG. 6 An illustration showing the position where the plate thickness radius of the crystallized glass member is measured in the example.

The plate thickness before and after molding (deformation) of the plate glass and the crystallized glass member was measured at nine positions shown in FIG. 6. An ultrasonic thickness meter MODEL25DL was used to determine the plate thickness. Table 7 shows the average of Examples 2, 6, 16 and 29. As shown in Table 7, members with substantially uniform thicknesses were obtained.

(4) Crystal Phase

Regarding the crystallized glass member obtained in Example 6, the precipitated crystal phases were discriminated on the basis of the angle of peaks appearing in the X-ray diffraction pattern using an X-ray diffraction analyzer (X'PERT-MPD, a product of Philips) and, as the case required, using TEMEDX (a product of Nippon Denshi JEM2100F). Crystal phases of $MgSiO_3$, $Mg_2TiO_5$, $Mg_2SiO_4$ and $NaAlSiO_4$ were confirmed.

[Chemical Strengthening of Crystallized Glass Member]

The crystallized glass member of 0.7 mm in thickness obtained in Example 1 was immersed in $KNO_3$ molten salt at 500° C. for 500 minutes to form a compressive stress layer on the surface of the crystallized glass member through the chemical strengthening method. The thickness of the compression stress layer was measured using a glass surface stress meter FSM-6000LE manufactured by Orihara Seisakusho. The compressive stress layer had a thickness of 94 μm and the value of surface compressive stress was 938 MPa. The central compressive stress value determined by curve analysis was 88 MPa.

The crystallized glass member of 0.7 mm in thickness obtained in Example 32 was immersed in $KNO_3$ molten salt at 460° C. for 500 minutes to form a compressive stress layer on the surface of the crystallized glass member through the chemical strengthening method. The thickness of the compression stress layer was measured using a glass surface stress meter FSM-6000LE manufactured by Orihara Seisakusho. The compressive stress layer had a thickness of 69 pin and the value of surface compressive stress was 1091 MPa. The central compressive stress value determined by curve analysis was 52 MPa.

Comparative Examples 1 and 2

In the Comparative Example 1, when the glass of Example 1 was molded at a high temperature of 880° C., the plate thickness varied, fusion to the molding member or deformation occurred, and molding could not be achieved.

In the Comparative Example 2, when the glass of Example 1 was molded at a low temperature of 770° C., the shape shown in FIG. 1 could not be obtained.

TABLE 1

| Composition (wt %) | Example 1-17 | Example 18-31 | Example 32-45 |
|---|---|---|---|
| $SiO_2$ | 54.56 | 52.91 | 54.21 |
| $P_2O_5$ | 0.00 | 0.00 | 0.00 |
| $Al_2O_3$ | 17.99 | 17.44 | 17.87 |
| $Li_2O$ | 0.00 | 0.00 | 0.00 |
| $Na_2O$ | 11.59 | 11.24 | 11.52 |
| $K_2O$ | 2.40 | 2.33 | 2.38 |
| $MgO$ | 7.84 | 7.61 | 7.79 |
| $CaO$ | 0.85 | 0.82 | 0.84 |
| $ZnO$ | 0.00 | 0.00 | 0.00 |
| $TiO_2$ | 4.70 | 4.55 | 4.67 |
| $ZrO_2$ | 0.00 | 0.00 | 0.00 |
| $Sb_2O_3$ | 0.08 | 0.08 | 0.08 |
| $Fe_2O_3$ | 0.00 | 2.91 | 0.00 |
| $CO_3O_4$ | 0.00 | 0.11 | 0.64 |
| $CoO$ | 0.00 | 0.00 | 0.00 |
| Total | 100.00 | 100.00 | 100.00 |

TABLE 2

| | Material property (before processing) | | | Heat treatment conditions | | | | Deformation conditions | | | | | | |
| | | | | Heating rate from 0° C. | Attainment temperature | Holding time at attainment temperature | Heating rate | Deformation temperature | Load (kg/cm2) | Holding time under load | Annealing rate | Specific gravity after deformation | Reflection chromaticity (no back) D65 5° incidence, 2° field | | |
| Example | Tg | At | Specific gravity | (° C./min) | (° C.) | (min) | (° C./min) | (lower mold) ° C. | max | (sec) | (° C./sec) | | L* | a* | b* |
|---|---|---|---|---|---|---|---|---|---|---|---|---|---|---|---|
| 1 | 642 | 732 | 2.520 | — | — | — | 8.89 | 800 | 0.5/0.8 | 7 | 13.33 | 2.530 | 35.85 | −0.06 | −0.85 |
| 2 | 642 | 732 | 2.520 | 26.67 | 800 | 0 | 8.89 | 800 | 0.5/0.8 | 7 | 13.33 | 2.533 | 35.67 | −0.07 | −0.8 |
| 3 | 642 | 732 | 2.520 | 26.67 | 800 | 120 | 9.22 | 830 | 0.5/0.8 | 7 | 13.83 | 2.578 | 67.96 | −4.66 | −22.68 |

TABLE 2-continued

| | | | | | | Deformation conditions | | | | | | | | |
|---|---|---|---|---|---|---|---|---|---|---|---|---|---|---|
| | Material property (before processing) | | | Heat treatment conditions | | | | Defor- | | | | | | Reflection chromaticity (no back) D65 5° incidence, 2° field |
| | | | | Heating rate from 0° C. | Attainment temperature | Holding time at attainment temperature | Heating rate | mation temperature | Load (kg/cm2) | Holding time under load | Annealing rate | Specific gravity after deformation | | |
| Example | Tg | At | Specific gravity | (° C./min) | (° C.) | (min) | (° C./min) | (lower mold) ° C. | min/max | (sec) | (° C./sec) | | L* | a* | b* |
| 4 | 642 | 732 | 2.520 | 23.71 | 830 | 30 | 9.22 | 830 | 0.5/0.8 | 7 | 13.83 | 2.569 | 59.79 | −2.25 | −25.16 |
| 5 | 642 | 732 | 2.520 | 23.71 | 830 | 120 | 9.22 | 830 | 0.5/0.8 | 7 | 13.83 | 2.579 | 62.89 | −3.34 | −25.25 |
| 6 | 642 | 732 | 2.520 | 23.71 | 830 | 300 | 9.22 | 830 | 0.5/0.8 | 7 | 13.83 | 2.589 | 68.22 | −4.14 | −21.24 |
| 7 | 642 | 732 | 2.520 | 21.25 | 850 | 30 | 9.22 | 830 | 0.5/0.8 | 7 | 13.83 | 2.567 | 81.36 | −3.82 | −13.51 |
| 8 | 642 | 732 | 2.520 | 21.25 | 850 | 120 | 9.22 | 830 | 0.5/0.8 | 7 | 13.83 | 2.570 | 80.69 | −3.52 | −13.29 |
| 9 | 642 | 732 | 2.520 | — | — | — | 8.89 | 850 | 0.8 | 7 | 13.33 | 2.549 | | | |
| 10 | 642 | 732 | 2.520 | — | — | — | 8.89 | 860 | 0.8 | 7 | 13.33 | 2.575 | | | |
| 11 | 642 | 732 | 2.520 | — | — | — | 8.89 | 870 | 0.8 | 7 | 13.33 | 2.583 | | | |
| 12 | 642 | 732 | 2.520 | — | — | — | 8.89 | 800 | 0.5/0.8 | 3 | 13.33 | 2.530 | | | |
| 13 | 642 | 732 | 2.520 | 26.67 | 800 | 0 | 8.89 | 800 | 0.5/0.8 | 3 | 13.33 | 2.533 | | | |
| 14 | 642 | 732 | 2.520 | — | — | — | 8.89 | 800 | 0.5/0.8 | 15 | 13.33 | 2.530 | | | |
| 15 | 642 | 732 | 2.520 | 26.67 | 800 | 0 | 8.89 | 800 | 0.5/0.8 | 15 | 13.33 | 2.533 | | | |
| 16 | 642 | 732 | 2.520 | — | — | — | 8.89 | 800 | 0.5/0.8 | 30 | 13.33 | 2.530 | | | |
| 17 | 642 | 732 | 2.520 | 26.67 | 800 | 0 | 8.89 | 800 | 0.5/0.8 | 30 | 13.33 | 2.533 | | | |

25

TABLE 3

| | | | | | | Deformation conditions | | | | | | | | |
|---|---|---|---|---|---|---|---|---|---|---|---|---|---|---|
| | Material property (before processing) | | | Heat treatment conditions | | | | Defor- | | | | | | Reflection chromaticity (no back) D65 5° incidence, 2° field |
| | | | | Heating rate from 0° C. | Attainment temperature | Holding time at attainment temperature | Heating rate | mation temperature | Load (kg/cm2) | Holding time under load | Annealing rate | Specific gravity after deformation | | |
| Example | Tg | At | Specific gravity | (° C./min) | (° C.) | (min) | (° C./min) | (lower mold) ° C. | min/max | (sec) | (° C./sec) | | L* | a* | b* |
| 18 | 641 | 725 | 2.565 | — | — | — | 8.89 | 800 | 0.5/0.8 | 7 | 13.33 | 2.570 | 26.54 | 0.01 | −1.34 |
| 19 | 641 | 725 | 2.565 | 26.67 | 800 | 0 | 8.89 | 800 | 0.5/0.8 | 7 | 13.33 | 2.573 | 26.59 | −0.07 | −1.21 |
| 20 | 641 | 725 | 2.565 | 26.67 | 800 | 120 | 9.22 | 830 | 0.5/0.8 | 7 | 13.83 | 2.625 | 27.02 | 0.44 | −1.94 |
| 21 | 641 | 725 | 2.565 | 23.71 | 830 | 30 | 9.22 | 830 | 0.5/0.8 | 7 | 13.83 | 2.625 | 28.49 | 0.2 | −2.85 |
| 22 | 641 | 725 | 2.565 | 23.71 | 830 | 120 | 9.22 | 830 | 0.5/0.8 | 7 | 13.83 | 2.639 | 29.93 | 0.39 | −2.36 |
| 23 | 641 | 725 | 2.565 | 23.71 | 830 | 300 | 9.22 | 830 | 0.5/0.8 | 7 | 13.83 | 2.653 | 30.89 | 0.77 | −2.32 |
| 24 | 641 | 725 | 2.565 | 21.25 | 850 | 30 | 9.22 | 830 | 0.5/0.8 | 7 | 13.83 | 2.606 | 31.46 | 0.6 | −2.1 |
| 25 | 641 | 725 | 2.565 | 21.25 | 850 | 120 | 9.22 | 830 | 0.5/0.8 | 7 | 13.83 | 2.602 | 34.05 | 0.98 | −3.13 |
| 26 | 641 | 725 | 2.565 | — | — | — | 8.89 | 800 | 0.5/0.8 | 3 | 13.33 | 2.570 | 28.18 | 0.05 | −3.7 |
| 27 | 641 | 725 | 2.565 | 26.67 | 800 | 0 | 8.89 | 800 | 0.5/0.8 | 3 | 13.33 | 2.573 | | | |
| 28 | 641 | 725 | 2.565 | — | — | — | 8.89 | 800 | 0.5/0.8 | 15 | 13.33 | 2.570 | 27.31 | −0.2 | −2.24 |
| 29 | 641 | 725 | 2.565 | 26.67 | 800 | 0 | 8.89 | 800 | 0.5/0.8 | 15 | 13.33 | 2.573 | | | |
| 30 | 641 | 725 | 2.565 | — | — | — | 8.89 | 800 | 0.5/0.8 | 30 | 13.33 | 2.570 | 27.6 | −0.07 | −1.72 |
| 31 | 641 | 725 | 2.565 | 26.67 | 800 | 0 | 8.89 | 800 | 0.5/0.8 | 30 | 13.33 | 2.573 | | | |

55

TABLE 4

| Ex- am- ple | Material property (before processing) Tg | At | Specific gravity | Heat treatment conditions Heating rate from 0° C. (° C./ min) | Attain- ment temper- ature (° C.) | Holding time at attainment temperature (min) | Heating rate (° C./ min) | Deformation conditions Defor- mation temper- ature (lower mold) ° C. | Load (kg/ cm2) min/ max | Holding time under load (sec) | An- nealing rate (° C./sec) | Specific gravity after defor- mation | Reflection chromaticity (no back) D65 5° incidence, 2° field L* | a* | b* |
|---|---|---|---|---|---|---|---|---|---|---|---|---|---|---|---|
| 32 | 648 | 726 | 2.553 | — | — | — | 8.89 | 800 | 0.5/0.8 | 7 | 13.33 | 2.532 | 27.07 | −1.19 | −4.25 |
| 33 | 648 | 726 | 2.553 | 26.67 | 800 | 0 | 8.89 | 800 | 0.5/0.8 | 7 | 13.33 | 2.535 | 26.89 | −0.74 | −4.09 |
| 34 | 648 | 726 | 2.553 | 26.67 | 800 | 120 | 9.22 | 830 | 0.5/0.8 | 7 | 13.83 | 2.580 | 47.84 | −0.66 | −24.86 |
| 35 | 648 | 726 | 2.553 | 23.71 | 830 | 30 | 9.22 | 830 | 0.5/0.8 | 7 | 13.83 | 2.579 | 44.29 | 0.96 | −25.61 |
| 36 | 648 | 726 | 2.553 | 23.71 | 830 | 120 | 9.22 | 830 | 0.5/0.8 | 7 | 13.83 | 2.584 | 47.06 | 0.29 | −24.53 |
| 37 | 648 | 726 | 2.553 | 23.71 | 830 | 300 | 9.22 | 830 | 0.5/0.8 | 7 | 13.83 | 2.591 | 47.65 | 1.59 | −25.66 |
| 38 | 648 | 726 | 2.553 | 21.25 | 850 | 30 | 9.22 | 830 | 0.5/0.8 | 7 | 13.83 | 2.572 | 57.1 | −3.09 | −20.65 |
| 39 | 648 | 726 | 2.553 | 21.25 | 850 | 120 | 9.22 | 830 | 0.5/0.8 | 7 | 13.83 | 2.578 | 55.36 | −0.13 | −23.5 |
| 40 | 648 | 726 | 2.553 | — | — | — | 8.89 | 800 | 0.5/0.8 | 3 | 13.33 | 2.532 | | | |
| 41 | 648 | 726 | 2.553 | 26.67 | 800 | 0 | 8.89 | 800 | 0.5/0.8 | 3 | 13.33 | 2.535 | | | |
| 42 | 648 | 726 | 2.553 | — | — | — | 8.89 | 800 | 0.5/0.8 | 15 | 13.33 | 2.532 | | | |
| 43 | 648 | 726 | 2.553 | 26.67 | 800 | 0 | 8.89 | 800 | 0.5/0.8 | 15 | 13.33 | 2.535 | | | |
| 44 | 648 | 726 | 2.553 | — | — | — | 8.89 | 800 | 0.5/0.8 | 30 | 13.33 | 2.532 | | | |
| 45 | 648 | 726 | 2.553 | 26.67 | 800 | 0 | 8.89 | 800 | 0.5/0.8 | 30 | 13.33 | 2.535 | | | |

TABLE 5

Chromaticity data of substrates before 3D molding (thickness 0.7 mmt)

| | Reflection chromaticity (no back) D65 5° incidence, 2° field L* | a* | b* | |
|---|---|---|---|---|
| Example 1-17 | 35.73 | −0.03 | −0.78 | Transparent |
| Example 18-31 | 26.46 | 0.15 | −1.99 | Black |
| Example 32-45 | 26.09 | −0.41 | −2.54 | Blue |

TABLE 6

| Example | Chromaticity difference \| Δ \| (no back) ΔL* | Δa* | Δb* |
|---|---|---|---|
| 1 | 0.12 | −0.03 | −0.07 |
| 2 | −0.06 | −0.04 | −0.02 |
| 3 | 32.23 | −4.63 | −21.9 |
| 4 | 24.06 | −2.22 | −24.38 |
| 5 | 27.16 | −3.31 | −24.47 |
| 6 | 32.49 | −4.11 | −20.46 |
| 7 | 45.63 | −3.79 | −12.73 |
| 8 | 44.96 | −3.49 | −12.51 |
| 18 | 0.08 | −0.14 | 0.65 |
| 19 | 0.13 | −0.22 | 0.78 |
| 20 | 0.56 | 0.29 | 0.05 |
| 21 | 2.03 | 0.05 | −0.86 |
| 22 | 3.47 | 0.24 | −0.37 |
| 23 | 4.43 | 0.62 | −0.33 |
| 24 | 5 | 0.45 | −0.11 |
| 25 | 7.59 | 0.83 | −1.14 |
| 26 | 1.72 | −0.1 | −1.71 |
| 28 | 0.85 | −0.35 | −0.25 |
| 30 | 1.14 | −0.22 | 0.27 |
| 32 | 0.98 | −0.78 | −1.71 |
| 33 | 0.8 | −0.33 | −1.55 |
| 34 | 21.75 | −0.25 | −22.32 |
| 35 | 18.2 | 1.37 | −23.07 |
| 36 | 20.97 | 0.7 | −21.99 |
| 37 | 21.56 | 2 | −23.12 |
| 38 | 31.01 | −2.68 | −18.11 |
| 39 | 29.27 | 0.28 | −20.96 |

TABLE 7

| | Before molding (mm) Min | Max. | After molding (mm) Min | Max. |
|---|---|---|---|---|
| Example 2 | 0.695 | 0.696 | 0.698 | 0.703 |
| Example 6 | 0.706 | 0.708 | 0.701 | 0.709 |
| Example 16 | 0.705 | 0.708 | 0.689 | 0.697 |
| Example 29 | 0.709 | 0.712 | 0.692 | 0.707 |

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for producing a crystallized glass member having a curved shape, comprising a deformation step including adjusting the temperature of a plate glass to a first temperature zone from higher than [At+40]° C. to [At+146]° C. or lower, where At is the yield point (° C.) of the plate glass and deforming at least part of the plate glass into a curved shape by external force acting on the plate glass while precipitating crystals from the plate glass.

2. The method for producing a crystallized glass members having a curved shape according to claim 1, wherein the first temperature range is from [At+50]° C. or higher to [At+145]° C. or lower.

3. The method for producing a crystallized glass member having a curved shape according to claim 1, wherein the plate glass includes, in terms of oxide-based weight %, 40.0% to 70.0% $SiO_2$ component, 11.0% to 25.0% $Al_2O_3$ component, 5.0% to 19.0% $Na_2O$ component, 0% to 9.0% $K_2O$ component, 1.0% to 18.0% of at least one selected from MgO component and ZnO component, 0% to 3.0% CaO component, 0.5% to 12.0% $TiO_2$ component, 0 to 15.0% $Fe_2O_3$ component, and 0 to 2.00% $CoO+Co_3O_4$ component.

4. The method for producing a crystallized glass member having a curved shape according to claim 1, further comprising a heat treatment step of heating the plate glass or the deformed plate glass to a second temperature range to precipitate crystals before or after the deformation step.

5. The method for producing a crystallized glass member having a curved shape according to claim 1, further comprising an ion exchange treatment step to create a compressive stress layer on the surface by performing an ion exchange treatment on the crystallized glass member having the curved shape after the deformation step.

\* \* \* \* \*